THERMOELECTRIC SYSTEM

Filed Jan. 23, 1959

Inventor:
SIEGFRIED POGANSKI
By Toulmin & Toulmin
Attorneys

United States Patent Office 2,993,080

Patented July 18, 1961

2,993,080
THERMOELECTRIC SYSTEM

Siegfried Poganski, Ruthen (Mohne), Germany, assignor to Licentia Patent-Verwaltungs-G.m.b.H., Hamburg, Germany Filed Jan. 23, 1959, Ser. No. 788,569
Claims priority, application Germany Feb. 3, 1958
3 Claims. (Cl. 136—4)

The invention relates to thermoelectric systems consisting of thermocouple elements, and particularly to such systems as are employed in refrigeration plants.

Thermoelectric systems can be used for cooling and/or heating in that a direct electrical current is passed through a thermocouple element arrangement. During the flow of the current, one terminal of the two thermocouple element arms heats whereas the other cools. By the cooling of this terminal, heat can be withdrawn from its surroundings, thereby producing cold. Similar heat can be imparted to the surroundings of the heating terminal.

It is well known that these thermocouple elements can be arranged in a wall of a cooling chamber in such a manner that the cold terminal portions are located on one side of the wall and the hot terminal portions on the other side thereof.

The known construction of a thermocouple element has been found to be particularly disadvantageous for building up a thermoelectric system when the thermocouple element to be used has arms which are relatively short, that is one tenth to one half of their thickness. Thus, if it is intended to employ a thermocouple element with arms which are of short length, this would mean that thin walls would have to be provided for the cooling chamber and as a result the thermal insulation would be less effective. For the known contact-making method presents difficulties in this respect owing to the occurring contact resistances. These increase very considerably in the case of the otherwise preferred employment of the thermocouple elements with arms which are relatively short in length.

It is, therefore, the object of my invention to provide a thermoelectric system which, as compared with the known theromelectric cooling elements, possesses the advantage that the thermocouple element arms can be brought into contact by pressure with the heat conducting bodies in a very simple and practical manner, whereby the abovementioned disadvantages of the known system are avoided.

The invention relates to a thermoelectric system comprising a first heat-conducting body, a first thermocouple element arm, a second heat-conducting body, a second thermocouple element arm and a third heat-conducting body, all of which are stacked to form a block-shaped body, so that the contact surfaces between the heat-conducting bodies and the two thermocouple element arms form cross-sectional areas of the block-shaped body, and that a portion of the first and third heat-conducting bodies project from the block-shaped body in one direction and a portion of the second heat-conducting body projects therefrom in the opposite direction.

In a thermoelectric system according to the invention one or each of the two thermocouple element arms is in the shape of a rectangular parallelepiped (or ashlar), the ratio between the length of the arm, measured in centimeters, and the cross-section of the arm, equally measured in square centimeters being less than 1.

According to another feature of the thermoelectric system according to the invention, the portions of the heat-conducting bodies projecting from the block-shaped body are constructed as heat transfer means.

Furthermore, it is recommended that the contact surfaces between the heat-conducting bodies and the two thermocouple element arms be arranged at least approximately parallel and be at least approximately of the same size and shape.

Another preferred feature of the thermoelectric system according to the invention is that the block-shaped body itself is axially symmetrical to the axis extending vertically to the parallel contact surfaces between the heat-conducting bodies and the thermocouple element arms.

The invention will be hereinafter explained and compared with a known form of construction with the aid of the accompanying drawings, in which.

Figures 1, 2, 3, 4, 5:
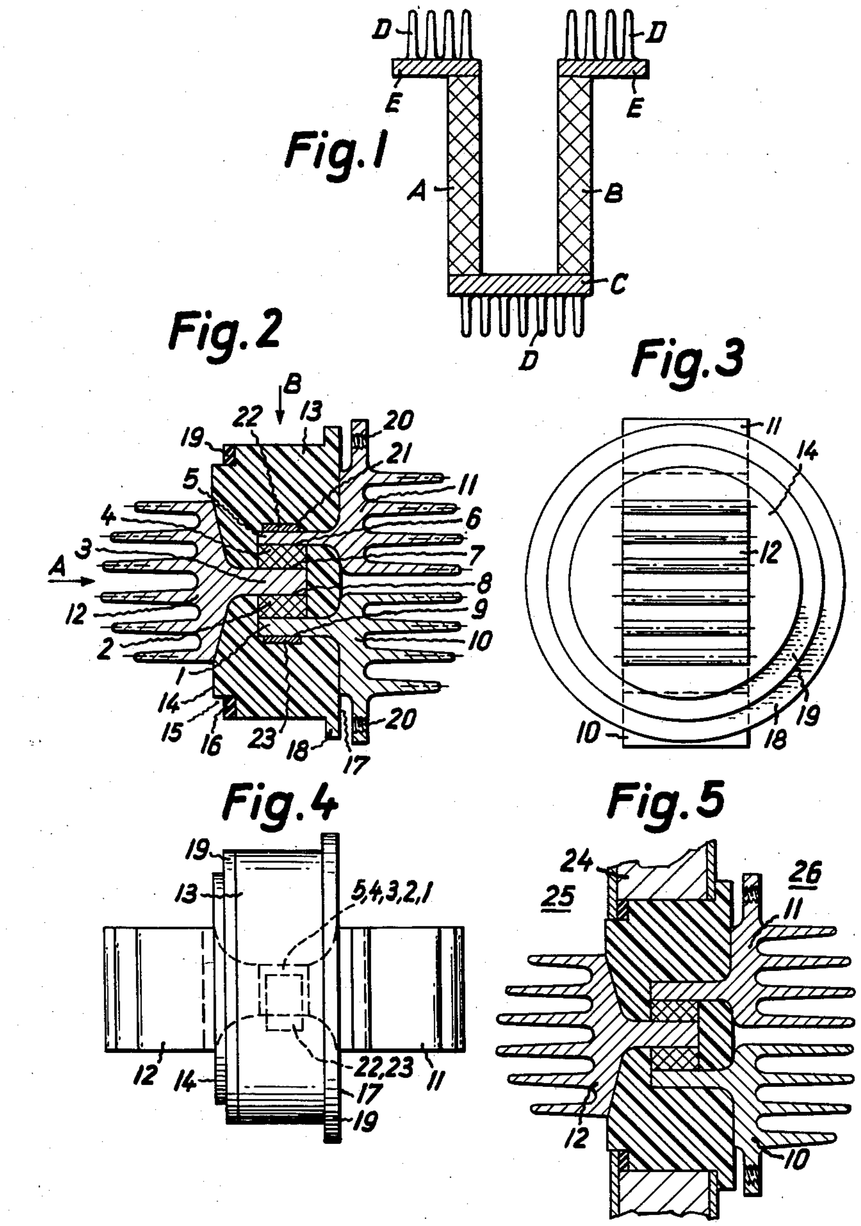
FIGURE 1 shows schematically a section view of a known arrangement for electrothermal cooling.
FIGURE 2 is a cross-section of a preferred embodiment of construction of the thermoelectric system according to the invention.
FIGURE 3 shows in side elevation the system illustrated in FIG. 2 viewed from the side indicated by the arrow A.
FIGURE 4 is another side elevation of the system illustrated in FIG. 2 but viewed from the side indicated by the arrow B in FIG. 2.
FIGURE 5 shows, partly schematically and in section, the assembly of the invention in the wall of a cold-storage plant.

A known arrangement for electrothermal cooling is shown in section in FIGURE 1 and consists of a thermoelectric cooling element comprising two adjacent, parallelly disposed rod-shaped thermocouple element arms A and B, connected at one end to a metal cross-piece C which is provided with ribs D for heat transfer on the side remote from the thermocouple element arms. The two other ends of the thermocouple element arms A and B are also provided with metallic current contact-pieces E disposed transversely to the thermocouple element arms and provided with heat transfer ribs D on their sides remote from the thermocouple element arms.

The preferred embodiment of the invention illustrated by way of example in FIGURES 2 to 4, comprises a first heat-conducting body 1, a first thermocouple element arm 2, a second heat-conducting body 3, a second thermocouple element arm 4 and a third heat-conducting body 5, all of these being stacked to form a block shaped body 1–5. The contact surfaces 6, 7, 8 and 9 between the three heat-conducting bodies 1, 3 and 5 and the two thermocouple element arms 2 and 4 respectively, form cross-sectional areas of the block-shaped body 1–5. A portion 10 of the first heat-conducting body 1 and a portion 11 of the third heat-conducting body 5 project out of the block-shaped body 1–5 in one direction, namely in the direction of the arrow A, and a portion 12 of the second heat-conducting body 3 projects from the block in the opposite direction.

The portions 10, 11 and 12 of the heat-conducting bodies 1, 3 and 5 projecting from the block-shaped body 1–5 are constructed as heat transfer means, preferably as ribbed bodies.

The contact surfaces 6, 7, 8 and 9 between the heat-conducting bodies 1, 3 and 5 and the thermocouple element arms 2 and 4 are arranged at least approximately parallel and are at least approximately of the same size and shape. The block-shaped body 1–5 itself, considered apart from the ribbed bodies 10, 11 and 12, is preferably axially symmetrical to an axis perpendicular to the parallel contact surfaces 6, 7, 8 and 9. It is advantageous if the dimension of the two thermocouple element arms 2 and 4 in the direction of the said symmetry axis of the block-shaped body 1–5 is smaller, and preferably less than half the smallest dimension of the thermocouple element arms 2 and 4 in the direction perpendicular to the said symmetry axis of the block-shaped body 1–5.

If, for example, plate-shaped thermocouple element arms 2 and 4 with square plate surface are employed, and the heat-conducting bodies 1, 3 and 5 are connected to the thermocouple element arms 2 and 4 by a square plate-shaped portion, a block-shaped body 1–5 of square cross-section is obtained. Such a block 1–5 has a tetragonal (quaternary) symmetry axis which stands perpendicular to the cross-section surfaces 6, 7, 8 and 9 and passes through the point of intersection of the diagonals of the cross-sectional square.

The block-shaped body 1–5 can be advantageously embedded in an insulating mass 13 from which there are projecting the portions 10, 11 and 12 of the heat-conducting bodies 1, 3 and 5, constructed as heat transfer means. The insulating mass 13 should be composed of a conventional electricity-insulating material having a sufficiently low heat conductivity, such as, for instance, foamed polystyrene.

The insulating mass 13 is preferably of disc shape, particularly circular disc shape, and the disc faces extend perpendicularly to the direction in which the portions 10, 11 and 12 of the heat-conducting bodies 1, 3 and 5, constructed as heat transfer means project. In order to facilitate introduction of the thermoelectric system according to the invention into an aperture in the wall of a housing or the like, the disc 13 of insulating material is preferably provided on the edge of one of its disc faces 14 with a groove 15 having a sealing surface 16 and on the edge of its other disc surface 17 with a flange 18 serving as abutment against the housing wall. The sealing surface 16 can advantageously accommodate a rubber gasket ring 19.

In the case of an advantageous construction of the ribbed bodies of the heat-transmission portions 10, 11 and 12, the planes of the ribs, which are indicated in FIGURES 2 and 3 in phantom lines, are perpendicular to the (planar) disc faces of the disc 13 of insulating material, parallel to each other and perpendicular to said symmetry axis of the block-shaped body 1–5.

Due to the advantage that a finished thermoelectric system according to the invention can be fitted in a wall of a plant, it is possible to so dimension the ribbed body 12 of the second heat-conducting body 3, that the ribbed body 12 of the second heat-conducting body 3, in its extension parallel to the disc face of the insulating material disc 13, does not protrude beyond the edge of the disc surface 14 of the insulating material 13 directed towards the second ribbed body 12. The ribbed bodies 10 and 11 of the heat-conducting bodies 1 and 5 can extend in the direction of the said symmetry axis of the block-shaped body 1–5 also about up to the edge of the insulating disc 13, but if necessary also beyond this edge.

The ribs of the ribbed bodies 10 and 11 next adjacent each other are at least approximately of the same distance from each other as the ribs of the two ribbed bodies 10 and 11 having the same rib spacing. The extension of the ribs perpendicular to the disc face of the insulating disc 13, that is the height of the ribs, is preferably different for the ribs of the second heat-conducting body 3 and for the ribs of the heat conducting bodies 1 and 5 and the dimension or extension of the ribs perpendicular to the height of the ribs and parallel to the plane of the ribs, that is the width of the ribs, is the same for all the ribs of the second heat-conducting body 3 and for all the ribs of the heat-conducting bodies 1 and 5. Each of the heat transmitting portions 10 and 11 is provided with means for connecting up with a source of electric current, preferably in the form of screw-threaded bores 20.

The two thermocouple element arms 2 and 4 and the heat-conducting bodies 1, 3 and 5 can be advantageously united by pressure contacts. In an arrangement which has proved particularly advantageous, the block-shaped body 1–5 formed by the thermocouple element arms 2 and 4 and the heat-conducting bodies 1, 3 and 5 is surrounded by a resilient clip 21, shown only in FIGURES 2 and 4. The two opposite electrically insulated jaws 22 and 23 of this clip bear against the sides of the first and third heat-conducting bodies 1 and 5 opposite the contact surfaces 6 and 9. The resilient clip 21 is preferably embedded in the insulating mass 21. The two thermocouple element arms 2 and 4 can advantageously consist of pressed and/or sintered semiconductor bodies. Especially when using thermocouple element arms produced in this manner contacts possessing satisfactory characteristics can be obtained by pressure contacts.

The heat conducting bodies are made from metals or alloys with relatively high thermal and high electrical conductivity, whereas in selecting the materials for the two thermocouple element arms relatively high thermoelectric voltage, relatively high electricity conductivity as well as relatively low heat conductivity are the determining factors.

The preferred metal for use in manufacturing the heat-conducting bodies is copper; aluminum could also be used although with somewhat inferior results.

In the thermocouples, which are composed preferably of semiconductor materials, the n-conductive arm is, for instance, made from an alloy containing about 75 mole-percent of $Bi_2Te_3$, about 25 mole-percent of $Bi_2Se_3$, and an addition of 0.02% by weight of $CuBr_2$. The p-conductive arm is preferably made from an alloy containing about 60 mole-percent of $Bi_2Te_3$, about 40 mole-percent of $Sb_2Te_3$ and an addition of 0.2% by weight of $CuSe_2$. Such thermocouple materials containing $Bi_2Te_3$, $Bi_2S_3$, $Bi_2Se_3$, $Sb_2Te_3$, $Sb_2S_3$ etc. are described, for instance, in Patent 2,762,857 to Lindenblad.

By selecting the direction of the direct current the thermoelectric system according to the invention can be operated so that, in one instance, the contact surfaces 6 and 9 are at increased temperature and the contact surfaces 7 and 8 at decreased temperature. In this case, heat is transferred to the surroundings by the heat transfer means 10 and 11 via the heat-conducting bodies 1 and 5, and heat absorption or, in other words, the generation of cold is effected by the heat transfer means 12 via the heat-conducting body 3. On changing the direction of current flow, heat will be released by the heat transfer means 12 and absorbed by the heat transfer means 10 and 11.

In FIGURE 5 a thermoelectric system 10—11—12 according to the invention is shown, in partly schematical view, in the wall 24 of a casing separating a space 25 from another space 26. Wall 24 consists of heat-insulating material and may comprise one or several of the thermo-electric systems according to the invention installed therein.

The thermoelectric system 10—11—12 may be operated in such a manner that electric current flow is established through the thermocouple 2, 4 in a chosen direction whereby space 25, into which heat transferring ribbed body 12 protrudes is at a lower temperature than space 26 into which heat transferring bodies 10 and 11 protrude.

By inverting the direction of current flow in thermocouple 2, 4, the temperature in space 25 may be raised to a higher heat, which heat will be drawn off from space 26. By a corresponding control of the directions of current flow, the thermoelectric system according to the invention may be used as a building element in a thermostat system.

It will be understood that this invention is susceptible to modification in order to adapt it to different usages and conditions, and, accordingly, it is desired to comprehend such modifications within the scope of the appended claims.

I claim:

1. A thermoelectric system, comprising a first heat-conducting body, a first thermocouple element arm, a second heat-conducting body, a second thermocouple element arm and a third heat-conducting body, all these being stacked one on the other to form a block-shaped body, the contact surfaces between the heat-conducting bodies and the two thermocouple element arms forming cross-section surfaces of the block-shaped body, and a portion of the first and of the third heat-conducting bodies projecting from the block-shaped body in one direction and a portion of the second heat-conducting body projecting from the block-shaped body in the opposite direction; a disc-shaped insulating mass in which said block-shaped body is embedded; said block-shaped body being axially symmetrical to an axis perpendicular to the parallel contact surfaces between said heat-conducting bodies and said thermocouple element arms; the portions of the heat-conducting bodies projecting from said block-shaped body comprising ribs so as to be devised as ribbed heat transfer means, which ribs extend in planes parallel to each other, perpendicular to the disc faces of said insulating mass, and perpendicular to the axis of symmetry of the block-shaped body and wherein the ribbed heat transfer means of the second heat-conducting body in its extension parallel to the disc face of the insulating disc, ends flush with the edge of the disc face of the insulating mass facing the last-mentioned ribbed body.

2. A thermoelectric system according to claim 1, wherein the ribs next adjacent each other of the ribbed heat transfer means of the first and third heat-conducting bodies are just as far apart as the ribs of the two ribbed heat transfer means of the first and third heat-conducting bodies.

3. A thermoelectric system according to claim 1, wherein the dimension of the ribs perpendicular to the disc face of the insulating mass is different for the second heat-conducting body and for the first and third heat-conducing bodies, and the dimension of the ribs parallel to the rib planes is the same for all ribs of the second heat-conducting body and for all ribs of the first and third heat-conducting bodies.

References Cited in the file of this patent

UNITED STATES PATENTS

| | | |
|---|---|---|
| 1,818,437 | Stuart | Aug. 11, 1931 |
| 2,597,752 | Salisbury | May 20, 1952 |
| 2,734,344 | Lindenblad | Feb. 14, 1956 |
| 2,749,716 | Lindenblad | June 12, 1956 |
| 2,762,857 | Lindenblad | Sept. 11, 1956 |
| 2,844,638 | Lindenblad | July 22, 1958 |
| 2,884,762 | Lindenblad | May 5, 1959 |
| 2,886,618 | Goldsmid | May 12, 1959 |

FOREIGN PATENTS

| | | |
|---|---|---|
| 23,227 | Austria | Feb. 26, 1906 |
| 371,523 | France | Mar. 9, 1907 |
| 6,869 | Great Britain | of 1886 |